(12) United States Patent
Gillis

(10) Patent No.: US 9,937,946 B1
(45) Date of Patent: Apr. 10, 2018

(54) COMPACT UNIVERSAL INFANT CARRIER TRANSPORTING DEVICE

(71) Applicant: Kasandra Marie Gillis, Ellensburg, WA (US)

(72) Inventor: Kasandra Marie Gillis, Ellensburg, WA (US)

( * ) Notice: Subject to any disclaimer, the term of this patent is extended or adjusted under 35 U.S.C. 154(b) by 0 days.

(21) Appl. No.: 15/363,198

(22) Filed: Nov. 29, 2016

Related U.S. Application Data

(60) Provisional application No. 62/260,696, filed on Nov. 30, 2015.

(51) Int. Cl.
| | | |
|---|---|---|
| *B62B 7/00* | (2006.01) | |
| *B62B 9/12* | (2006.01) | |
| *B62B 3/02* | (2006.01) | |
| *B62B 7/12* | (2006.01) | |
| *B62B 7/14* | (2006.01) | |
| *B62B 9/08* | (2006.01) | |

(52) U.S. Cl.
CPC ............... *B62B 9/12* (2013.01); *B62B 3/025* (2013.01); *B62B 7/004* (2013.01); *B62B 7/12* (2013.01); *B62B 7/142* (2013.01); *B62B 9/082* (2013.01); *B62B 2205/06* (2013.01)

(58) Field of Classification Search
CPC .. B62B 9/10; B62B 9/12; B62B 7/004; B62B 7/06; B62B 7/14–7/142
See application file for complete search history.

(56) References Cited

U.S. PATENT DOCUMENTS

| | | | | | |
|---|---|---|---|---|---|
| 1,432,114 | A | * | 10/1922 | Mahr ......................... | B62B 7/14 280/42 |
| 1,741,014 | A | * | 12/1929 | DeBelack .............. | A47D 13/02 280/31 |
| 2,478,512 | A | * | 8/1949 | Taylor ....................... | B62B 7/06 16/436 |
| 3,917,302 | A | * | 11/1975 | Gebhard ................... | B62B 7/06 280/644 |
| 3,995,882 | A | * | 12/1976 | Watkins ................ | B62L 37/068 280/42 |
| 4,266,807 | A | * | 5/1981 | Griffin .................... | B62B 7/083 280/42 |
| 4,618,184 | A | * | 10/1986 | Harvey ................... | B62B 7/123 280/47.4 |
| 4,664,397 | A | * | 5/1987 | Reinboth .................. | B62B 7/06 280/37 |
| 5,388,852 | A | * | 2/1995 | Bigo ......................... | B62B 7/08 280/42 |

(Continued)

*Primary Examiner* — Erez Gurari
(74) *Attorney, Agent, or Firm* — Millikin McKay PLLC

(57) ABSTRACT

The present invention is a compact universal infant carrier transporting device which is used to transport most infant carriers/car seats from one point to another with ease with the infant secured in the carrier. The device's portability and size allows for use in the smallest of spaces and allows users to avoid having to manually hold a heavy infant and carrier/car seat combination. The core components of the invention are a collapsible patio chair style frame supported on wheels. The frame supports a fabric base having an opening therein for receiving the carrier/car seat. A strap is provided to secure the carrier to the device, and a foot brake is provided on at least one of the wheels. The device folds so that it can be stored in a bag similar to a bag similar to those used for a folding patio chair.

16 Claims, 6 Drawing Sheets

(56) References Cited

U.S. PATENT DOCUMENTS

| | | | | |
|---|---|---|---|---|
| 5,580,072 A * | 12/1996 | Monneret | B62B 9/10 | 280/47.38 |
| 5,634,654 A * | 6/1997 | Lin | B62B 7/06 | 280/47.38 |
| 5,954,404 A * | 9/1999 | Suzuki | B62B 9/10 | 280/647 |
| 5,956,766 A * | 9/1999 | Benway | B62B 9/10 | 2/69 |
| 5,964,470 A * | 10/1999 | Syendsen | A47D 13/025 | 224/153 |
| 6,105,997 A * | 8/2000 | Watkins | B62B 7/083 | 280/42 |
| 6,241,273 B1 * | 6/2001 | Gehr | B62B 7/06 | 224/409 |
| 6,276,759 B1 * | 8/2001 | Lan | B60B 37/10 | 280/47.38 |
| 6,322,138 B1 * | 11/2001 | Tang | A47C 4/286 | 297/16.2 |
| 6,409,205 B1 * | 6/2002 | Bapst | B62B 7/06 | 280/642 |
| 6,443,480 B1 * | 9/2002 | Wu | B62B 7/083 | 280/644 |
| 6,478,327 B1 * | 11/2002 | Hartenstine | B62B 7/06 | 280/47.38 |
| 6,527,294 B1 * | 3/2003 | Brewington | B62B 7/06 | 16/30 |
| 6,814,333 B1 * | 11/2004 | Freiburger | F16M 11/38 | 248/150 |
| 6,820,927 B2 * | 11/2004 | Isom | A47C 7/66 | 297/129 |
| 6,899,383 B2 * | 5/2005 | Hwang | A47C 4/286 | 297/16.1 |
| 6,926,355 B2 * | 8/2005 | Le Gette | A45F 4/02 | 297/129 |
| 7,189,164 B1 * | 3/2007 | Paesang | A47D 13/105 | 297/16.2 |
| 7,226,059 B1 * | 6/2007 | Samuels | B62B 3/027 | 280/33.991 |
| 7,510,208 B1 * | 3/2009 | Lochmueller | B62B 7/08 | 280/20 |
| 7,845,720 B2 * | 12/2010 | Randall | A47C 4/42 | 224/155 |
| 8,316,483 B2 * | 11/2012 | Thomas | A47D 5/00 | 256/25 |
| 8,388,015 B2 * | 3/2013 | Chen | B62B 3/007 | 280/642 |
| 8,764,048 B1 * | 7/2014 | Ahnert | B62B 9/104 | 280/47.4 |
| 8,882,135 B1 * | 11/2014 | Chen | B62B 3/02 | 280/651 |
| 9,409,665 B1 * | 8/2016 | Gregory | B65B 67/1205 | |
| 9,623,890 B1 * | 4/2017 | Horowitz | B62B 3/022 | |
| 2006/0138826 A1 * | 6/2006 | Caton | A47D 13/02 | 297/256.16 |
| 2008/0231022 A1 * | 9/2008 | Hu | B62B 7/142 | 280/643 |
| 2014/0353945 A1 * | 12/2014 | Young | B62B 3/02 | 280/650 |
| 2015/0329135 A1 * | 11/2015 | Sun | B62B 9/24 | 280/649 |

* cited by examiner

COMPACT UNIVERSAL INFANT CARRIER TRANSPORTING DEVICE

CROSS-REFERENCE TO RELATED APPLICATIONS

The present application claims priority to U.S. Provisional Patent Application No. 62/260,696 for Compact Universal Infant Carrier Transporting Device that was filed on Nov. 30, 2015.

BACKGROUND OF THE INVENTION

1. Field of the Invention

The present invention relates generally to a compact universal infant carrier transporting device that is collapsible and can be easily transported.

2. Description of the Related Art

Currently there are a number of solutions for transporting an infant carrier/car seat from point A to point B. Some of these solutions attempt to provide a handle on the infant carrier/car seat itself so that you can hold it however you feel comfortable. These solutions fail to meet the needs of the industry for several reasons. First, once you get a child in the carrier/car seat, they become quite heavy. Second, when one is trying to carry an infant carrier/car seat manually, the child can get quite shaken up resulting in waking them or making them unhappy. The real detriment from carrying these manually is the number of arm/neck/shoulder/back/elbow injuries reported from performing this task.

Other solutions attempt to provide a stroller frame travel system that you can purchase to go along with your specific carrier. The carrier then snaps into the specific stroller travel system. These solutions also fail to meet the needs of the industry because in a lot of situations (i.e. bank, grocery store, airport, doctor's appointment, restaurant) space does not allow for the large stroller frame to come along, resulting in having to hold the infant carrier manually resulting in arm/neck/shoulder/back/elbow injuries, waking baby, unhappy baby, etc. In addition, these type of travel systems tend to be expensive. And lastly, other solutions attempt to make a universal lightweight car seat carrier, but these solutions are similarly unable to meet the needs of the industry because the pull cart type frame and stroller style frames are still much too large to accommodate for use in small spaces. The size/shape of these frames do not allow for easy portability. These units also are quite expensive.

It would be desirable to have a compact universal infant carrier transporting device that is lightweight and compact enough to carry in a case and use in the smallest of spaces. With the compact design, the carrier can be used in small spaces where stroller style and pull cart style systems cannot go. Therefore, there currently exists a need in the industry for a compact universal infant carrier transporting device.

SUMMARY OF THE INVENTION

The present invention advantageously fills the aforementioned deficiencies by providing a universal infant carrier transporting device that is so compact and light weight it can be used in the smallest of spaces and the user can easily carry it and store it anywhere in a carrying case. The invention can be grasped by the handle when in use or being carried or can be hung by the handle for storage.

The present invention is a compact universal infant carrier transporting device which is made up of the following components: a collapsible patio chair frame comprising: 1) at least four support legs, 2) pairs of crossed front, rear and side legs that are all pivotally connected; 3) connectors for stabilizing the carrier when opened and for collapsing the carrier to a compact form when closed; 4) a fabric base support that when in the expanded or opened position has an opening for the car seat to rest in and is coupled to said support legs; 5) fabric material located below the car seat holding base for storage, 6) restraint strap attached to the frame and located beneath the car seat holding base to hold the car seat in place with the carrier when deemed necessary, 7) wheels mounted to the base members allowing for easy frame movement, 8) locking brakes, 9) handlebar assemblies that extend up from the lower members, and 10) a fabric carrying case with fabric strap to be used for carrying and storing.

The present invention may also have one or more of the following: 1) a fabric net located under opening of fabric/plastic carrier base; 2) a latch mechanism to hold the handlebar assembly together, 3) detachable fabric pockets/ouches that clamp onto the frame for storage, 4) a variety of wheel sizes, 5) a mechanism allowing retraction and extension of the handlebars, 6) Velcro® hook and loop fasteners may be added anywhere on the carrier, 7) a rubber car seat carrying base, 8) a plastic car seat carrying base, 9) rubber grippers, 10) clips on the carrying case to make for easy storage/transport, 11) a mechanism allowing for collapsible handles on the handle bars, 12) rubber bungees attached to the frame to help support the car seat that may or may not be adjustable, 13) detachable wheels, 14) attachable piece or pieces that turn unit into a regular cart, 15) removable fabric canopy to cover child, 16) wheels only attachment that works for transporting car seat, and 17) a plastic carrying case.

The present invention is unique when compared with other known devices and solutions because the present invention provides a simplified design that is lightweight and collapsible in a way that makes it compact enough to be useful in any circumstance. It can be carried easily in its case or hung, making for great portability. Design simplifies the construction of a stroller style system and hand truck style system which saves on manufacturing costs to provide a compact and lightweight universal carrier transporting device at a low price.

The present invention is unique in that it is structurally different from other known devices or solutions. More specifically, the present invention is unique due to the collapsible patio chair style of frame it employs. Specifically, this lightweight compact design allow a user to easily transport the carrier in collapsed position in the carrying case, allowing for use in the smallest of spaces.

Among other things, it is an object of the present invention to provide a compact universal infant carrier transporting device that does not suffer from any of the problems or deficiencies associated with prior solutions.

It is still a further object of the present invention to create a device that is more economical to produce, easier to manufacture and easier to repair.

Further still, it is an object of the present invention to create a device that is smaller and more lightweight than other solutions, thereby enabling the device to be more easily portable.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE PREFERRED EMBODIMENT

Figure 1:
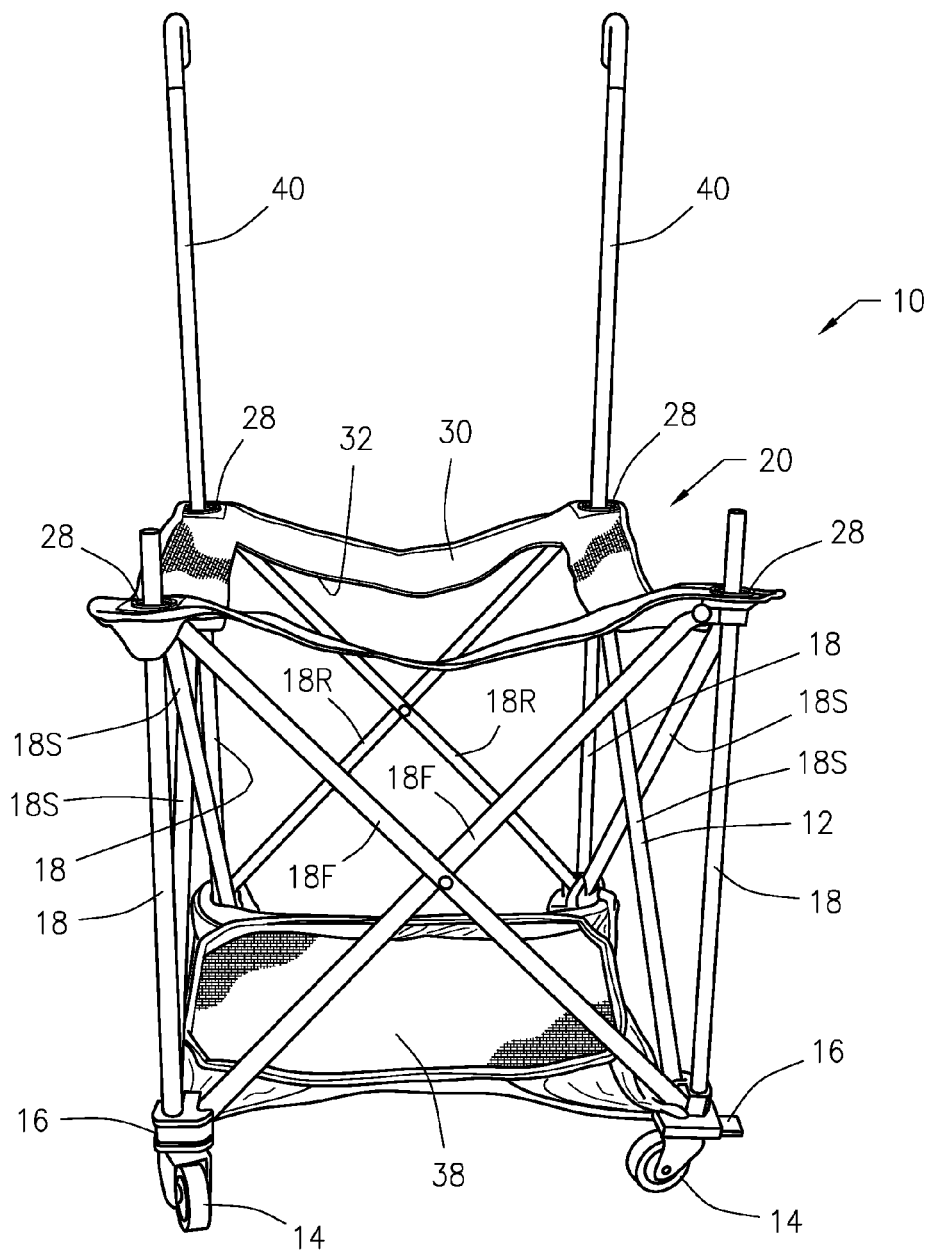
FIG. 1 is a front perspective view of a compact universal infant carrier transporting device constructed in accordance with a preferred embodiment of the present invention. The device is shown in an unfolded, opened position that is ready for use.
Figure 3:
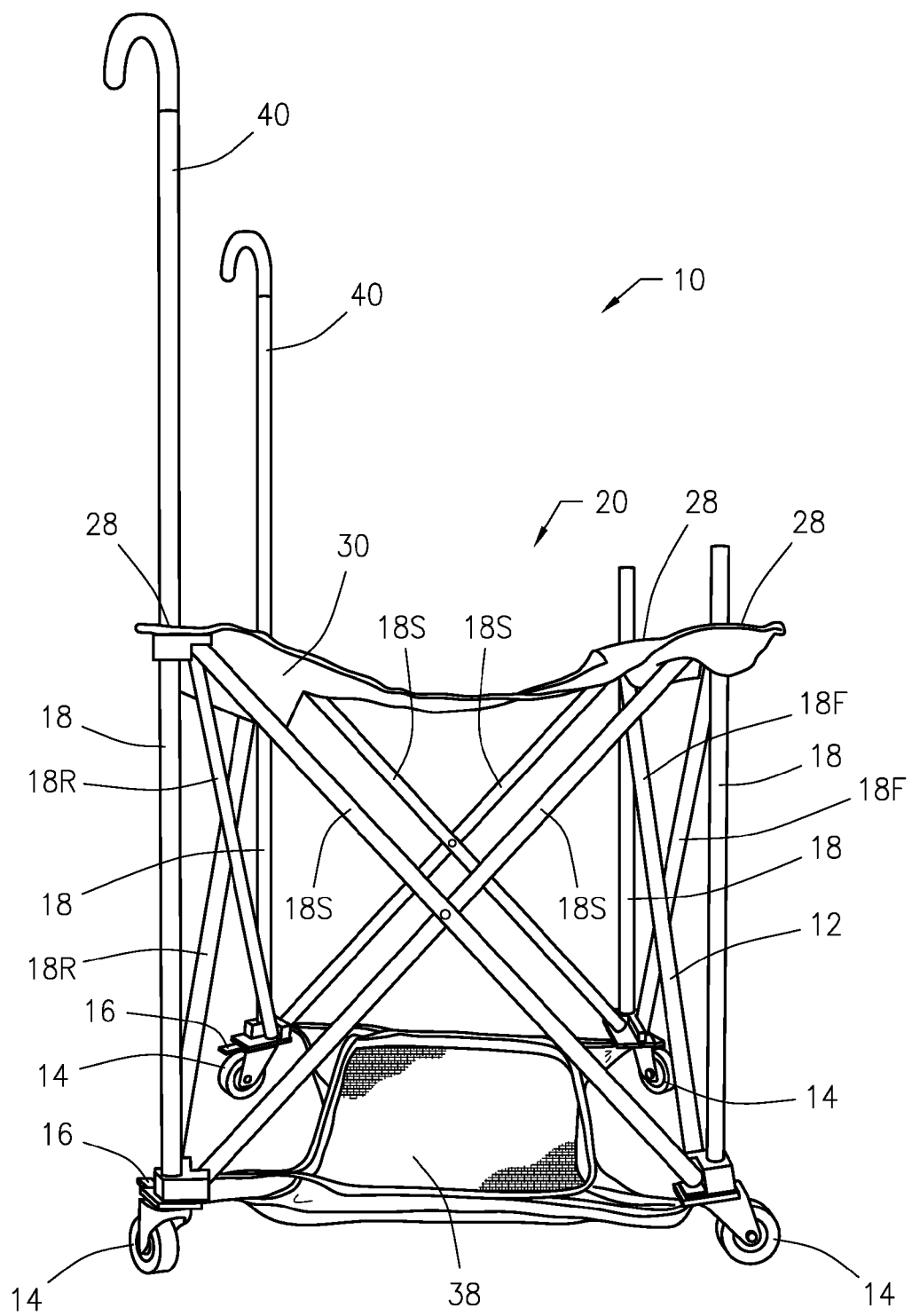
FIG. 3 is a right side view of the device of FIG. 1.
Figure 5:
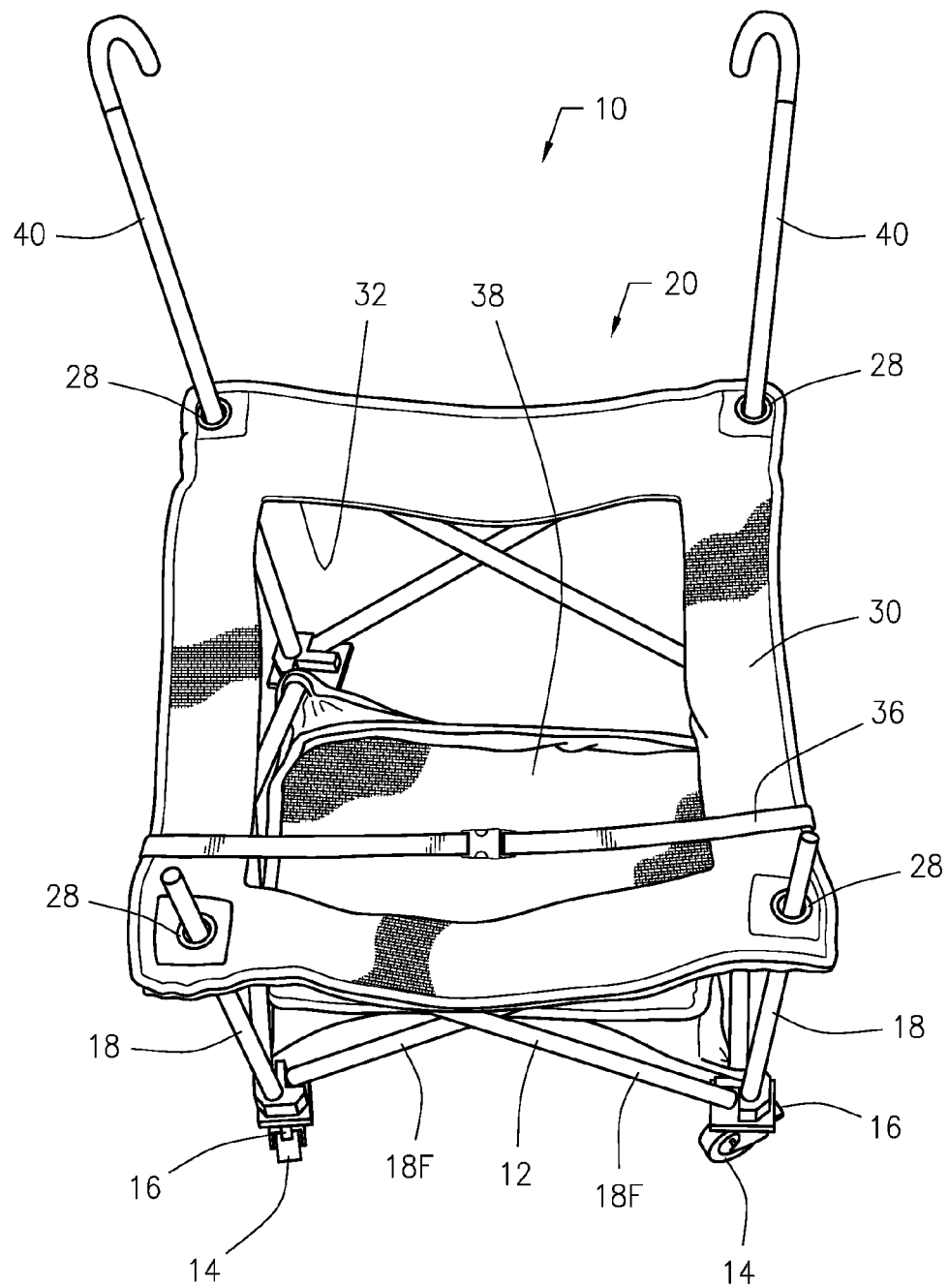
FIG. 5 is a top perspective view of the device of FIG. 1.

Referring now to the drawings and initially to FIGS. 1, 3 and 5, there is illustrated a compact universal infant carrier transporting device 10 that is constructed in accordance with a preferred embodiment of the present invention. The device 10 consists of a collapsible folding frame 12 supported on wheels 14. Locking brakes 16 are provided on at least one of the wheels 14 to allow the device 10 to be locked so that it will not roll away when it is desirable to hold the device 10 is a stable position.

Figure 2:
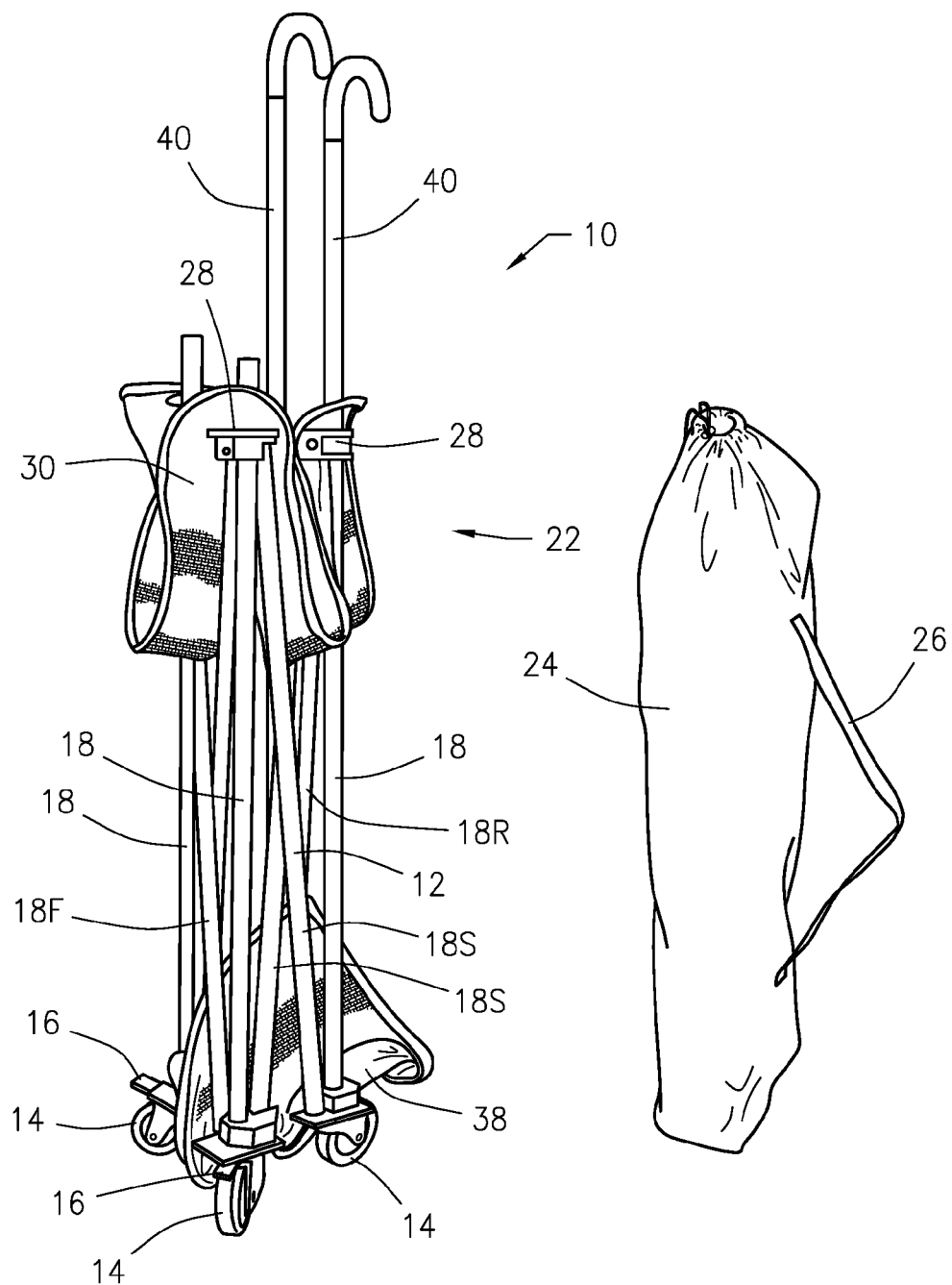
FIG. 2 is a front perspective of the device of FIG. 1 shown in a folded, fully collapsed position that is ready for storage.

The collapsible frame 12 is similar to the frame employed in a collapsible patio chair in that it has four supporting legs 18 with at least one support leg pivotally engaging a second leg so as to move the collapsible carrier between an expanded, open position 20 as illustrated in FIG. 1 that is ready for use, to a collapsed, folded, closed position 22 as illustrated in FIG. 2 that is ready to be placed in a carrying bag 24 to ready the device for storage or for carrying. The carrying bag 24 illustrated in FIG. 2 is provided with a carrying strap 26 for ease in carrying.

The frame 12 employs pairs of crossed front, rear and side legs, 18F, 18R and 18S respectively that are all pivotally connected to allow the frame 12 to be moved between the open position 20 and the closed position 22. The frame 12 is also provided with connectors 28 for stabilizing the frame 12 when in its open position 20 and for collapsing the frame 12 to its compact folded position 22 when closed.

Figure 4:
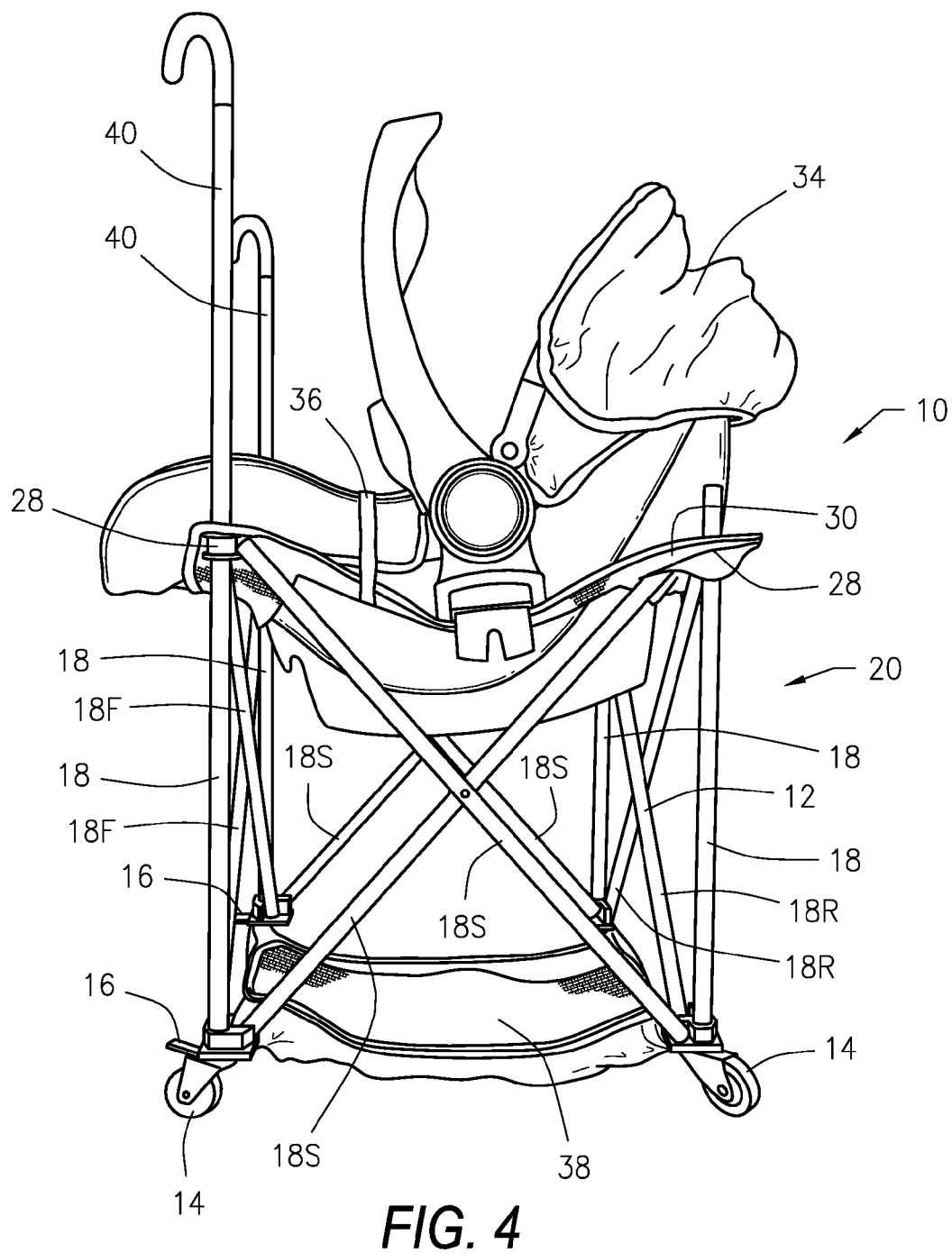
FIG. 4 is the device of FIG. 3 shown in use with an infant carrier secured in place on the device.
Figure 6:
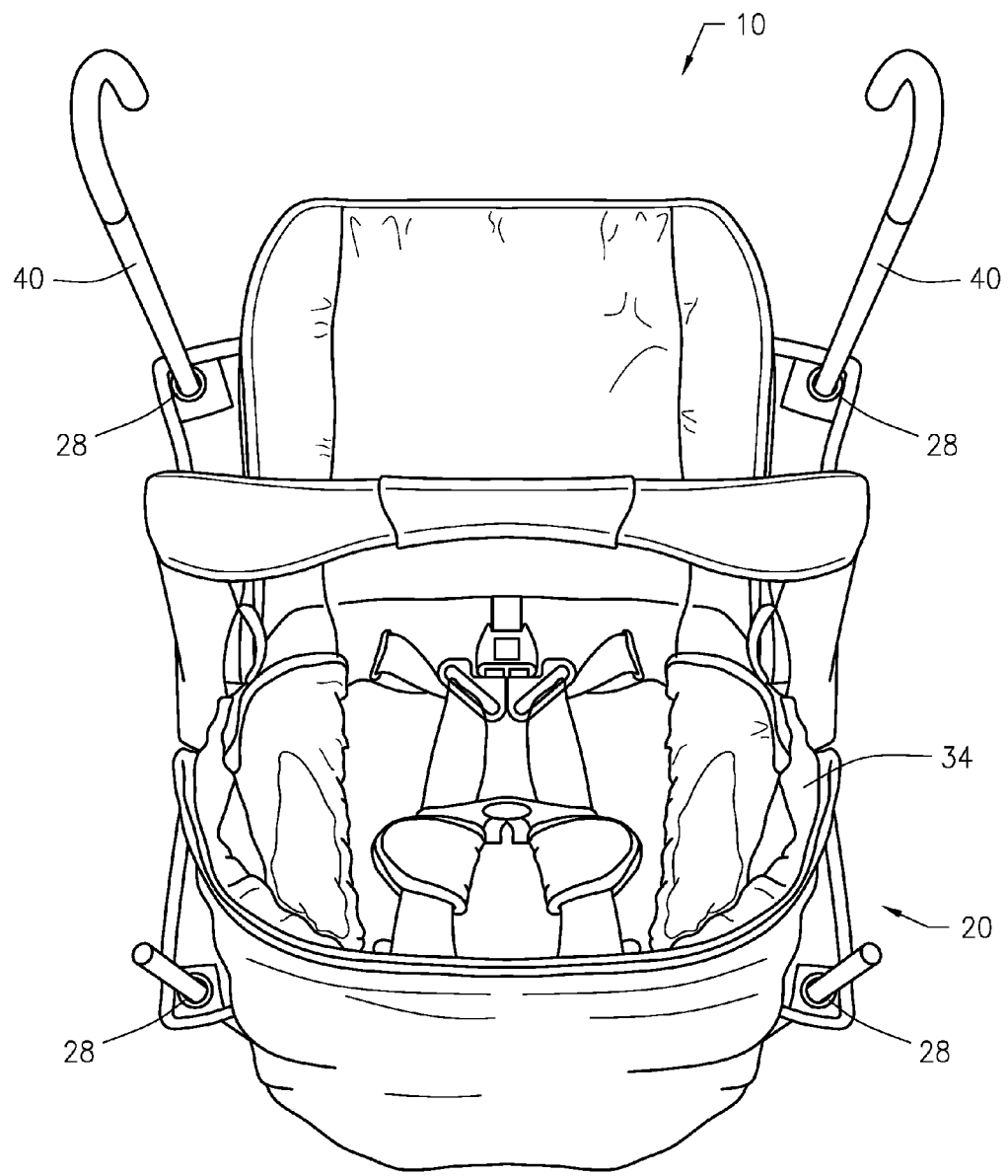
FIG. 6 is a top perspective view of the device and infant carrier of FIG. 4.

As illustrated in FIGS. 1 and 5, a fabric base support 30 is supported on the frame 12. The fabric base support 30 is provided with an opening 32 therein that is sized and shaped for receiving and holding an infant carrier/car seat 34 when the device 10 is in its open position 20, as illustrated in FIGS. 4 and 6.

As illustrated in FIG. 5, the device 10 is provided with an adjustable strap 36 for securing the infant carrier/car seat 24 to the device 10.

Fabric material 38 attached to the legs 18 of the device 10 and located below the base support 30 forms a lower storage shelf for the device 10.

A handle bar assembly 40 attaches to the frame 12 to provide a place for the user to grasp as a means for the user to control the movement of the device 10.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A compact universal infant carrier transporting device in combination with an infant carrier comprising:
   a fully collapsible frame supported on wheels such that all four sides of the frame collapse, said collapsible frame capable of being moved to an open position, a fabric base support suspended from a top of the collapsible frame, an opening provided in the fabric base support of a size and shape for removably receiving an infant car seat carrier, and an infant car seat removably securable within the opening.

2. A compact universal infant carrier transporting device in combination with an infant carrier according to claim 1 further comprising:
   at least one handle provided on the collapsible frame for pushing the frame as it rolls around on the wheels.

3. A compact universal infant carrier transporting device in combination with an infant carrier according to claim 2 further comprising:
   fastening means for securing the infant car seat carrier to the frame when the infant car seat carrier is resting on the fabric base support.

4. A compact universal infant carrier transporting device in combination with an infant carrier according to claim 3 further comprising:
   a foot locking brake provided on at least one of the wheels.

5. A compact universal infant carrier transporting device in combination with an infant carrier according to claim 4 further comprising:
   fabric material attached to the frame to form an open storage shelf that is accessible below the fabric base support while the fabric base support is in use.

6. A compact universal infant carrier transporting device in combination with an infant carrier according to claim 1 wherein said frame collapses to a closed position so that it can be placed within a carrying bag.

7. A compact universal infant carrier transporting device in combination with an infant carrier according to claim 6 further comprising:
   at least one handle provided on the collapsible frame for guiding the frame as it rolls around on the wheels.

8. A compact universal infant carrier transporting device in combination with an infant carrier according to claim 6 further comprising:
   fastening means for securing the infant car seat carrier to the frame when the infant car seat carrier is resting on the fabric base support.

9. A compact universal infant carrier transporting device in combination with an infant carrier according to claim 6 further comprising:
   a foot locking brake provided on at least one of the wheels.

10. A compact universal infant carrier transporting device in combination with an infant carrier according to claim 6 further comprising:

fabric material attached to the frame to form an open lower storage shelf that is accessible below the fabric base support while the fabric base support is in use.

11. A compact universal infant carrier transporting device comprising: a fully collapsible frame supported on wheels such that all four sides of the frame collapse inward toward each other to allow the frame to collapse to an elongated rectangular shape when in its fully collapsed position, a carrying device for receiving the frame when in its fully collapsed position, said collapsible frame capable of being moved to an open position, a fabric base support suspended from a top of the collapsible frame, an opening provided in the fabric base support of a size and shape for removably receiving an infant car seat carrier so that an infant car seat can be supported from the fabric base support when the collapsible frame is in its open position; two u-shaped handles provided on the collapsible frame for pushing the frame as it rolls around on the wheels and for hanging the frame on a grocery cart or similar object when the frame is fully collapsed; and fastening means for securing an infant car seat carrier to the frame when the infant car seat carrier is resting on the fabric base support.

12. A compact universal infant carrier transporting device according to claim 11 further comprising:
a foot locking brake provided on at least one of the wheels.

13. A compact universal infant carrier transporting device according to claim 12 further comprising:
fabric material attached to the frame to form a lower an open storage shelf that is accessible below the fabric base support while the frame is in its open position.

14. A compact universal infant carrier transporting device according to claim 11 wherein the carrying device is provided with a handle for carrying the carrying device and an attached infant carrier transporting device.

15. A compact universal infant carrier transporting device according to claim 14 further comprising:
a foot locking brake provided on at least one of the wheels.

16. A compact universal infant carrier transporting device according to claim 14 further comprising:
fabric material attached to the frame to form an open lower storage shelf that is accessible below the fabric base support when the frame is in its open position.

\* \* \* \* \*